No. 743,771. PATENTED NOV. 10, 1903.
J. H. THAYER.
MACHINE FOR GUMMING AND STRAIGHTENING THE TEETH OF SAWS.
APPLICATION FILED DEC. 1, 1902.
NO MODEL. 9 SHEETS—SHEET 3.
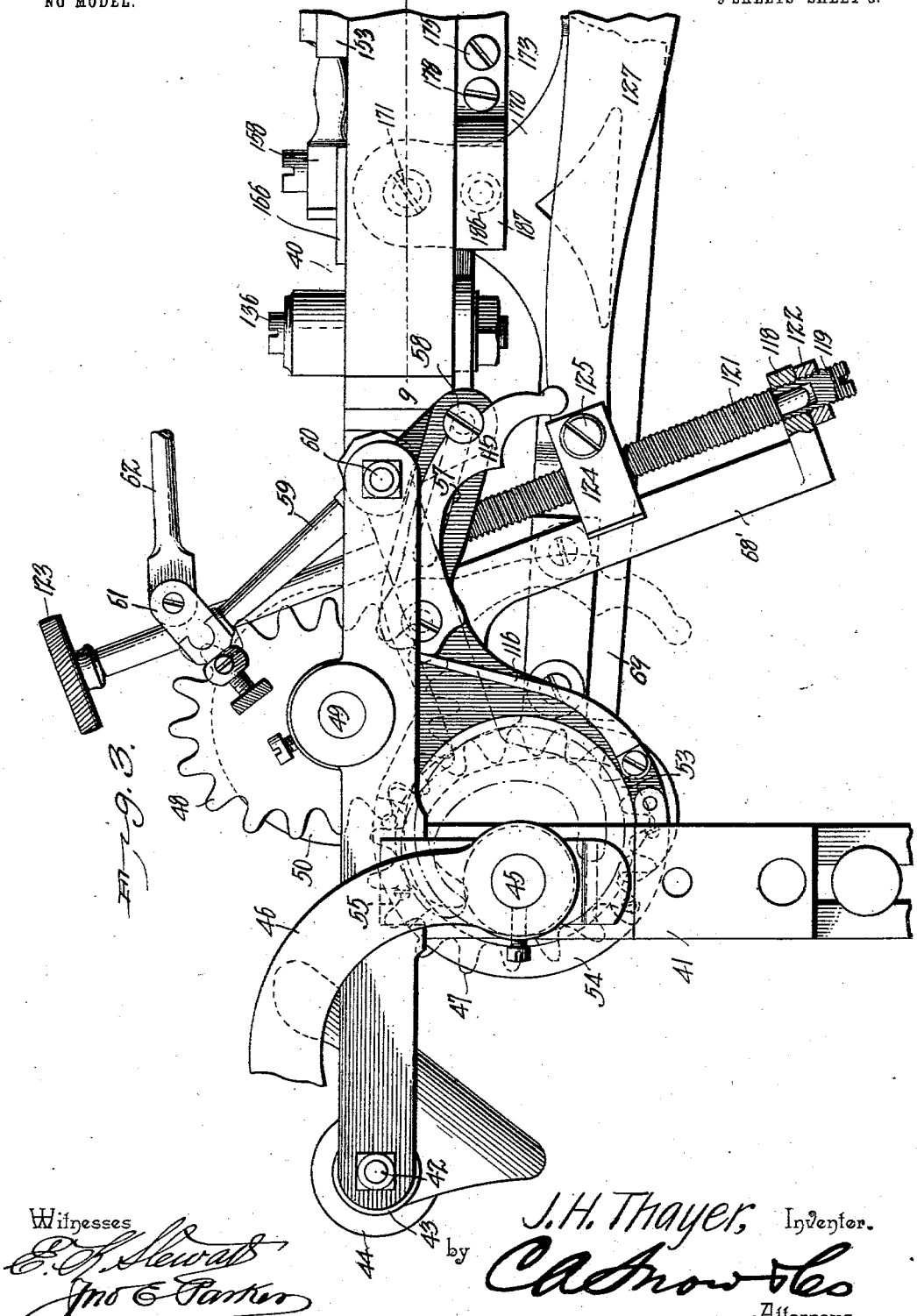

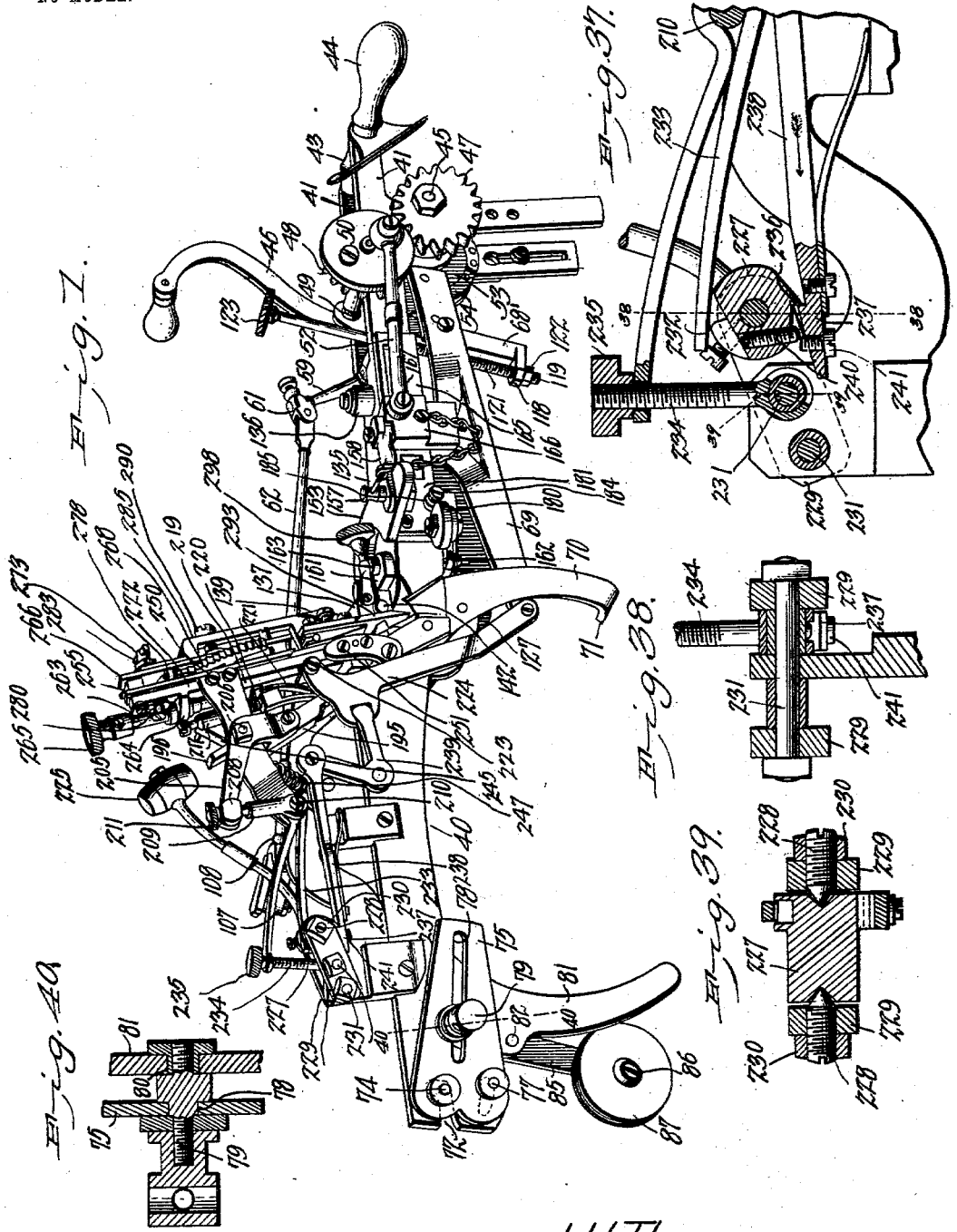

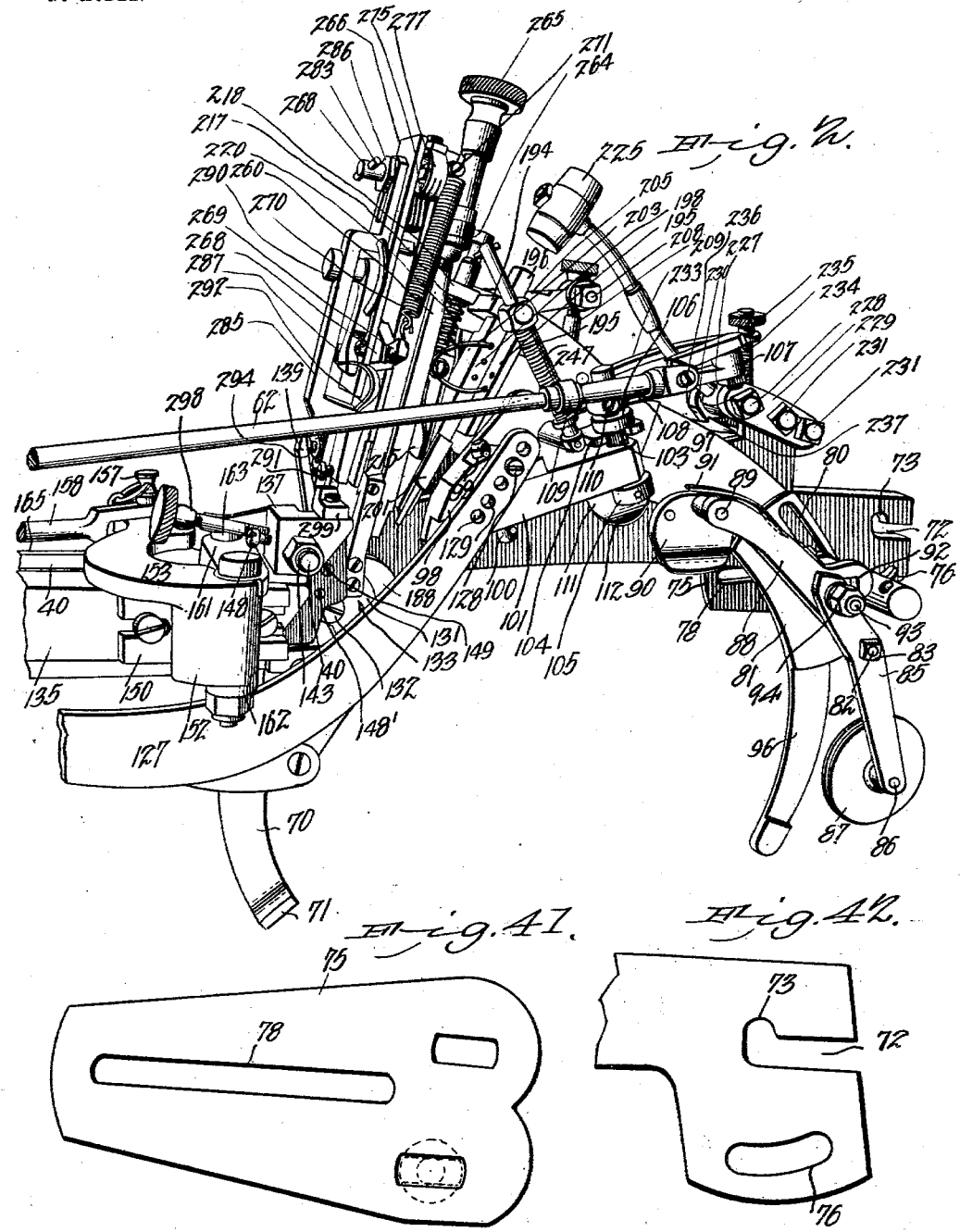

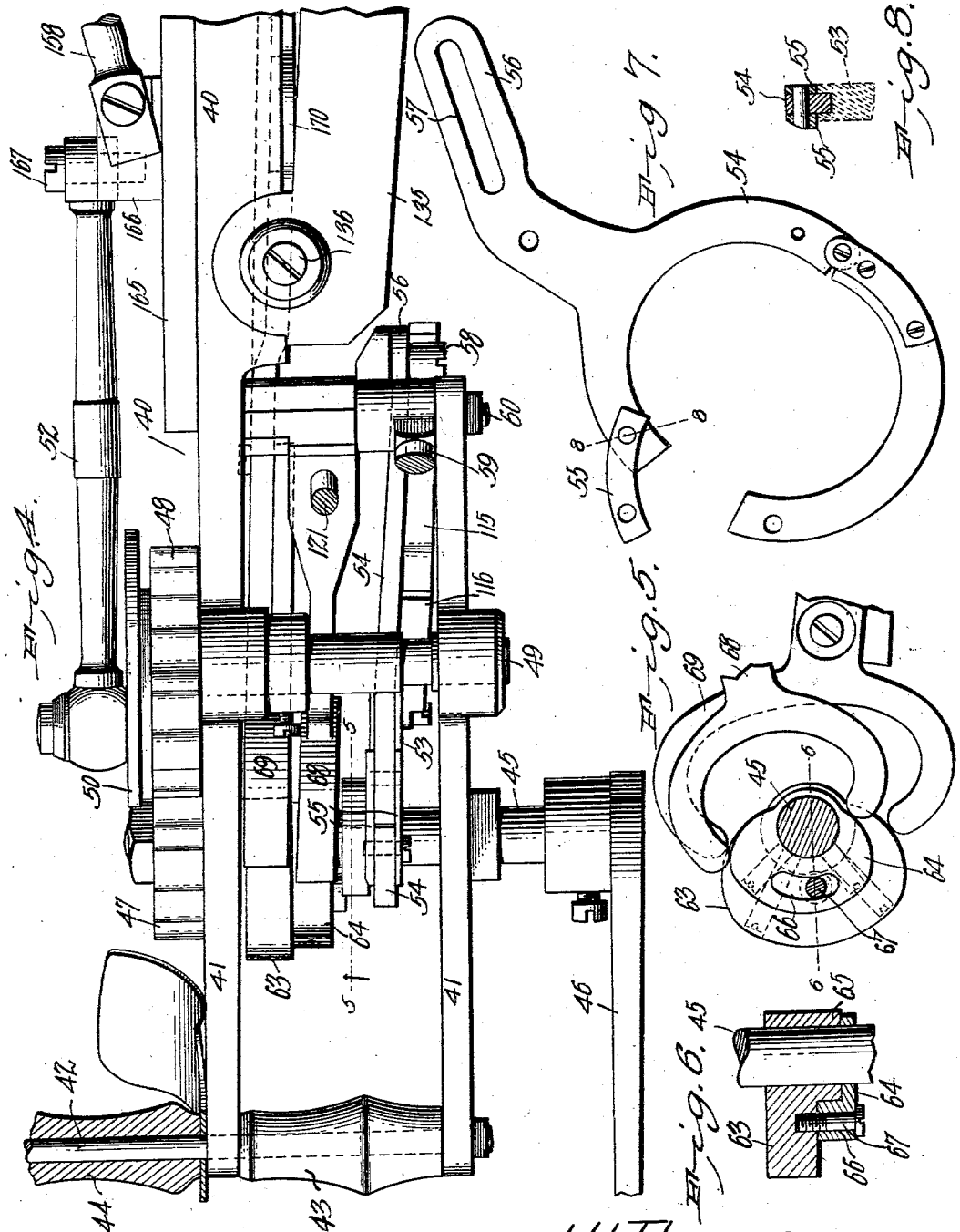

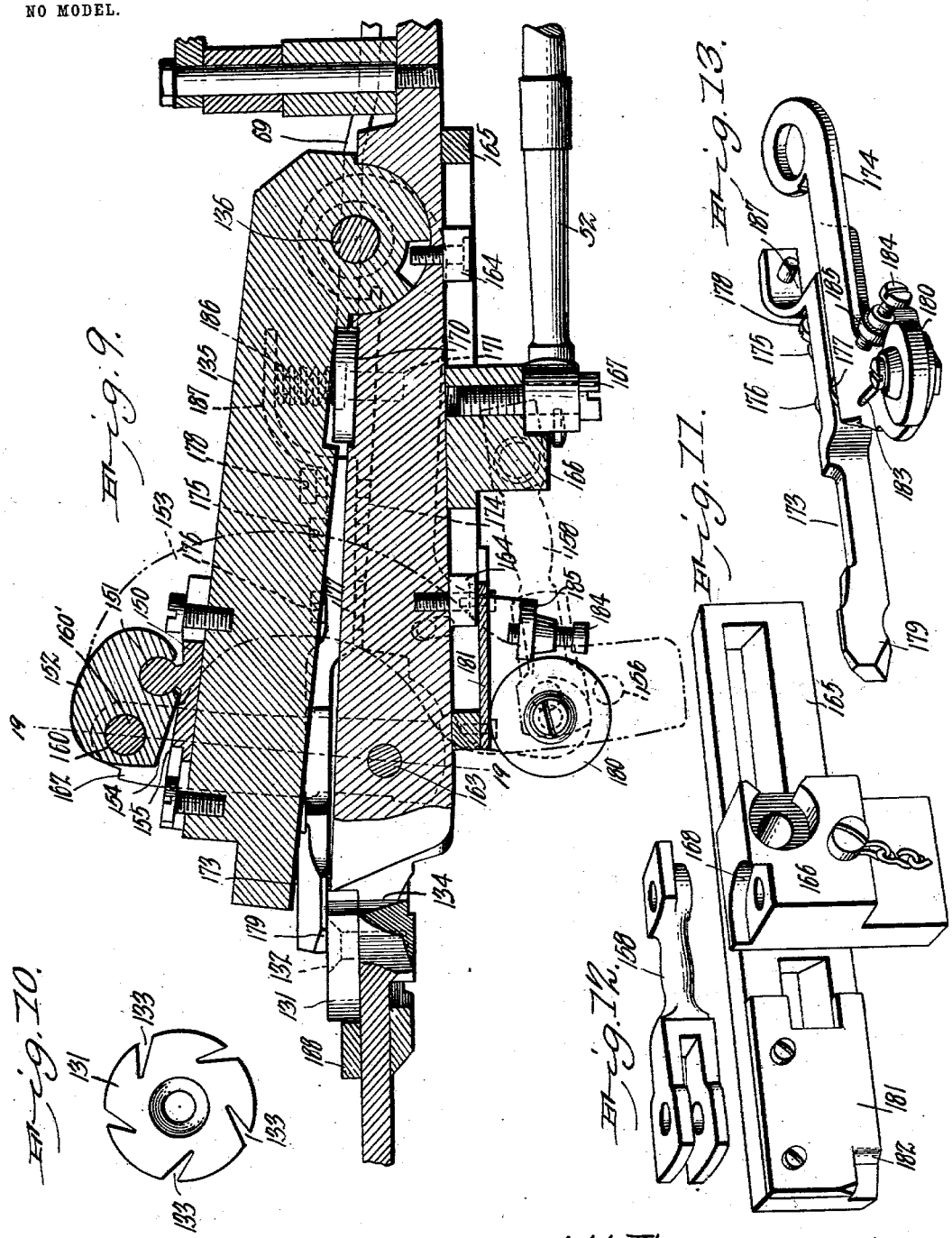

No. 743,771. PATENTED NOV. 10, 1903.
J. H. THAYER.
MACHINE FOR GUMMING AND STRAIGHTENING THE TEETH OF SAWS.
APPLICATION FILED DEC. 1, 1902.
NO MODEL. 9 SHEETS—SHEET 6.
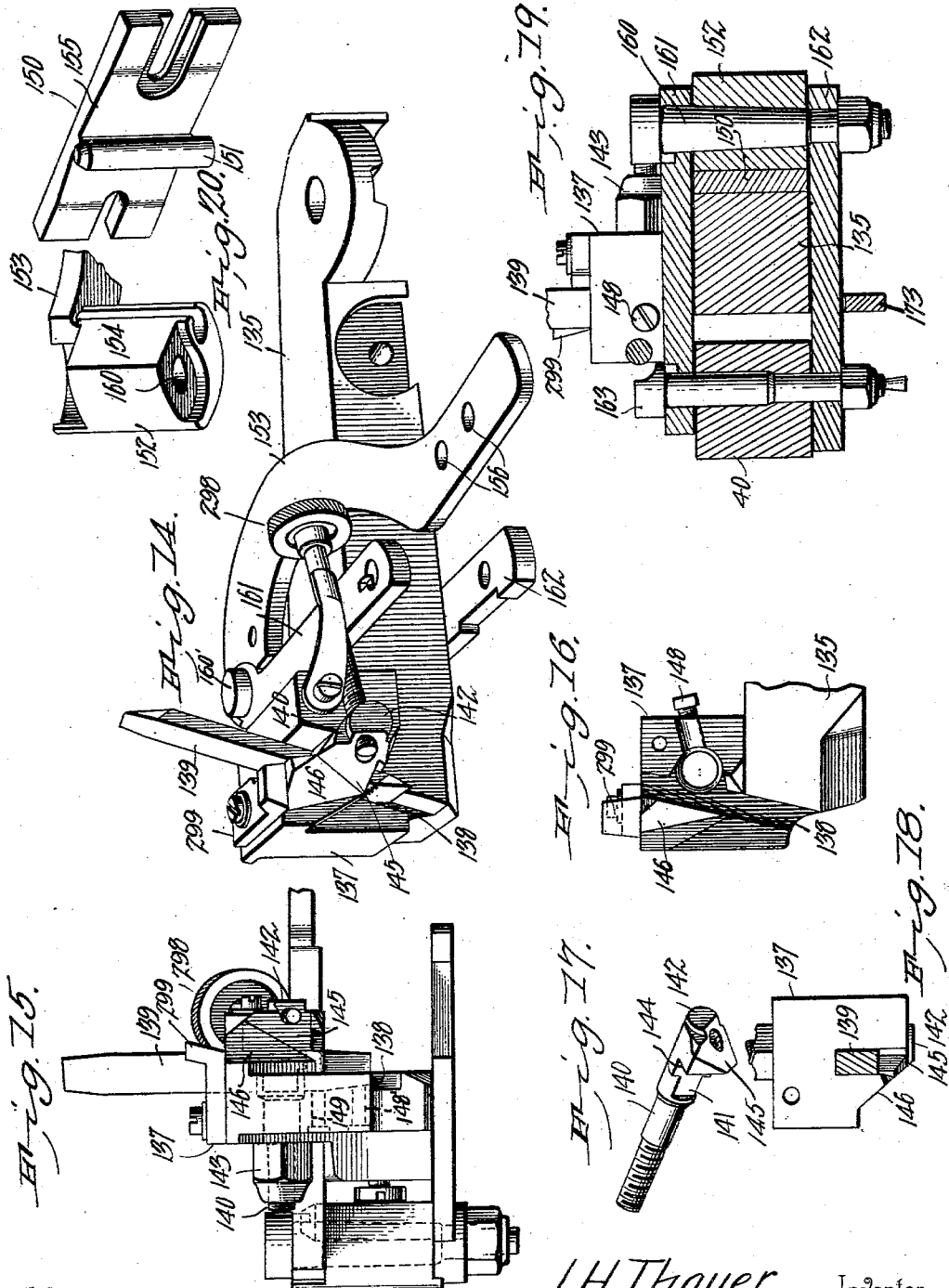
Witnesses
J. H. Thayer, Inventor.
by C. A. Snow & Co.
Attorneys

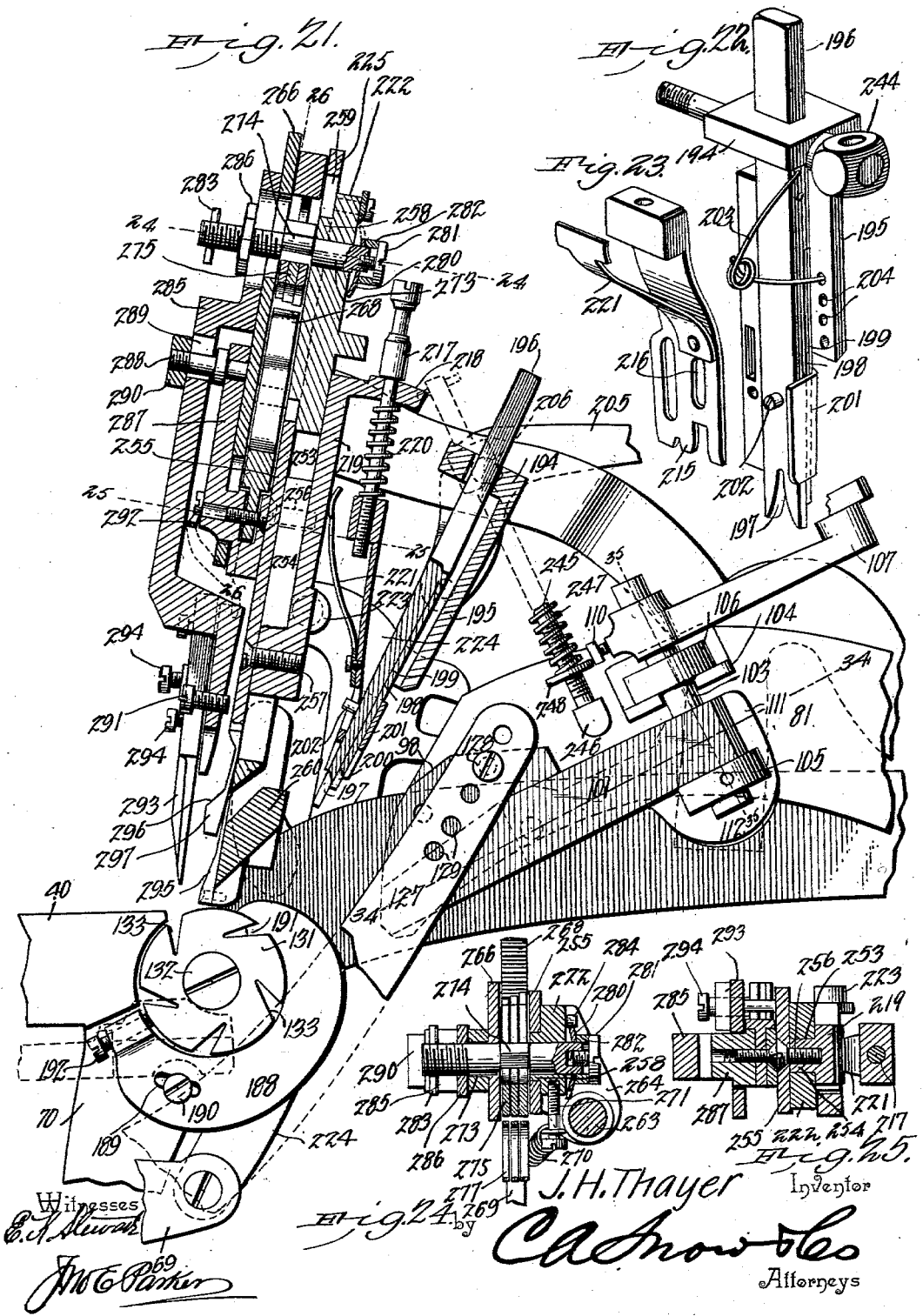

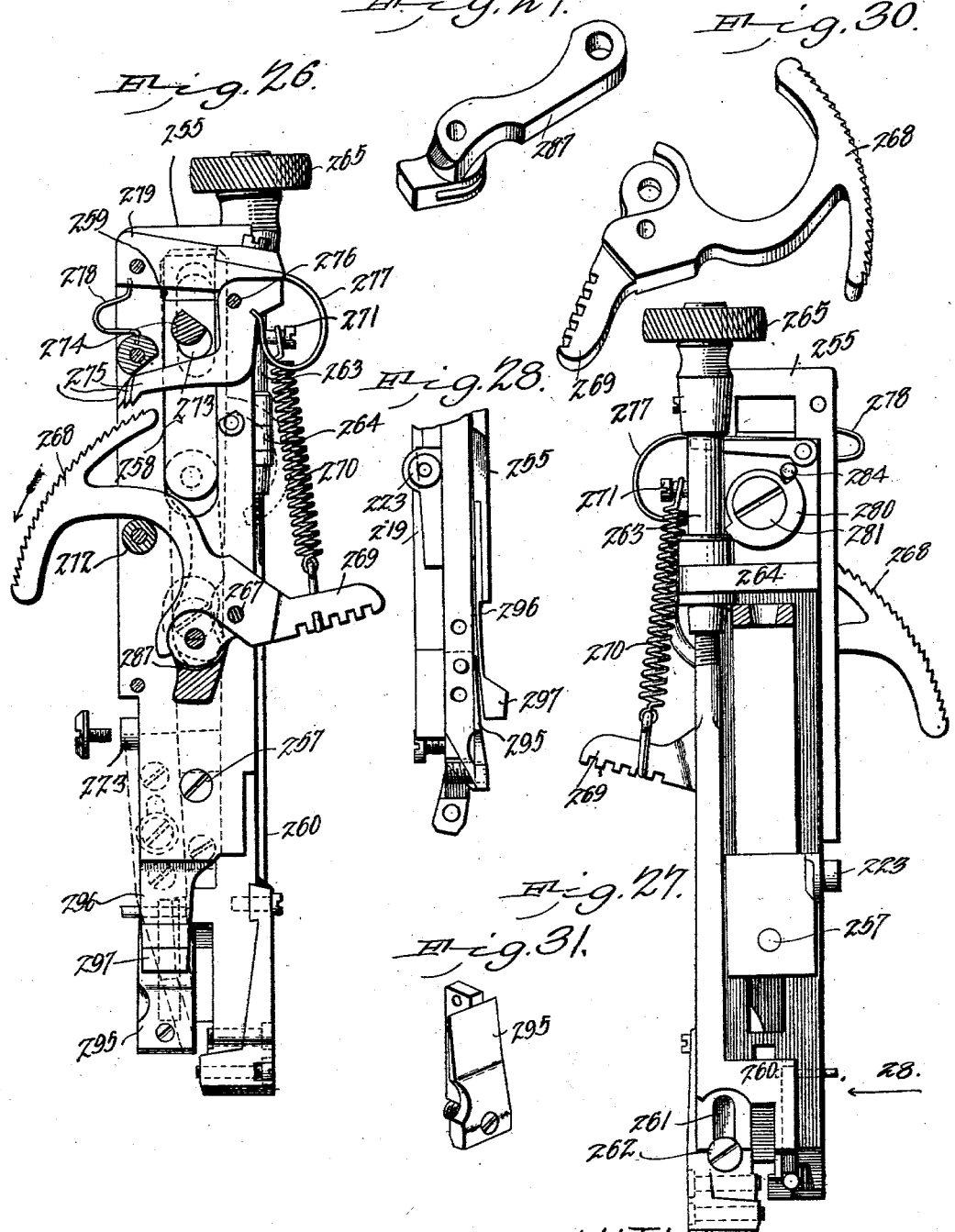

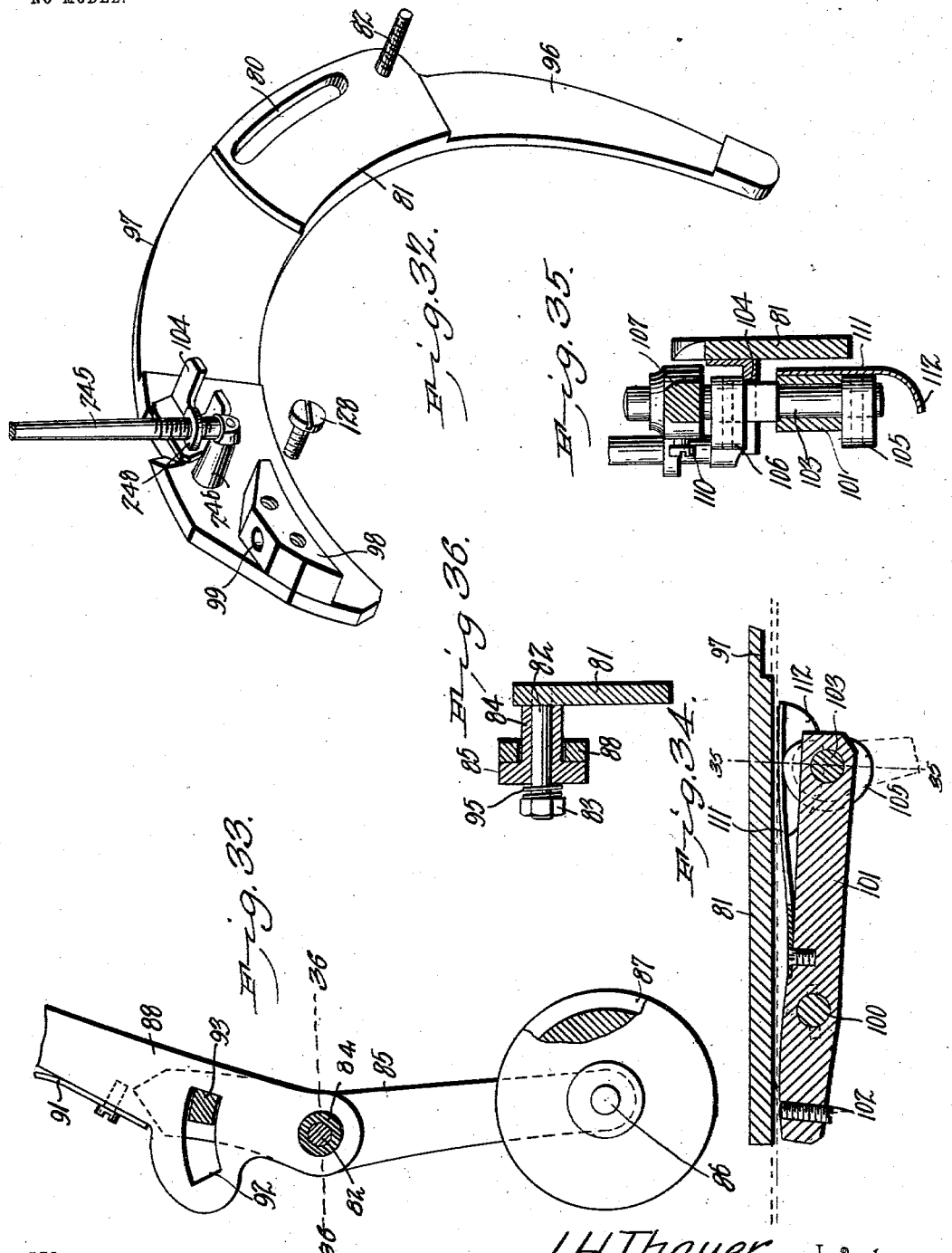

No. 743,771.                                                    Patented November 10, 1903.

UNITED STATES PATENT OFFICE.

JULIEN H. THAYER, OF MOUNT PLEASANT, NORTH CAROLINA.

MACHINE FOR GUMMING AND STRAIGHTENING THE TEETH OF SAWS.

SPECIFICATION forming part of Letters Patent No. 743,771, dated November 10, 1903.

Application filed December 1, 1902. Serial No. 133,395. (No model.)

*To all whom it may concern:*

Be it known that I, JULIEN H. THAYER, a citizen of the United States, residing at Mount Pleasant, in the county of Cabarrus and State of North Carolina, have invented a new and useful Machine for Gumming and Straightening the Teeth of Saws, of which the following is a specification.

This invention relates to certain improvements in machines of that class employed for gumming and straightening the teeth of the saws of cotton-gins and delinting-machines.

The principal object of the invention is to provide an efficient device of a portable type in the form of a self-contained compact machine which may be readily carried from place to place and employed directly at the ginnery without the necessity of shipping the gin-saws to a workshop.

A further object of the invention is to provide an easily-handled automatic machine which may be readily adjusted to saws of different diameter and having teeth of different pitch.

A still further object of the invention is to provide an automatic feed for gradually bringing the teeth of the saw to position to be operated upon by the straightening and cutting devices, the feeding mechanism being capable of adjustment without stopping the operation of the machine and being independent of the saw-teeth in that the accuracy of the feed is not affected by the absence of one or more teeth or by teeth that are unequally spaced.

A further object of the invention is to provide an automatic cutting mechanism for deepening the gullets or spaces between the teeth and for the formation of new teeth when necessary and in connection therewith to provide an automatic extractor for removing the chips of metal from the cutting-die.

A still further object of the invention is to construct a cutting mechanism capable of forcing its way through a saw of any thickness without unduly increasing the strain on the operator and without rendering the machine cumbersome by the addition of metal to resist the cutting strain, and, further, to so arrange the power-transmitting mechanism that the operator is enabled to transmit the operative force to the best advantage during the cutting operation.

A still further object of the invention is to so arrange the device as to automatically straighten any teeth which may have become twisted or bent.

A still further object of the invention is to provide a mechanism of which all parts may be adjusted to suit different conditions, as dictated by the diameter of the saw or the pitch of its teeth.

With these and other objects in view the invention consists in the novel construction and arrangement of parts, hereinafter described, illustrated in the accompanying drawings, and particularly pointed out in the appended claims In the drawings, Figure 1 is a perspective view of a gin-saw-dressing machine constructed in accordance with my invention. Fig. 2 is a similar view drawn to a somewhat larger scale and illustrating a portion of the machine as viewed from the side opposite to that illustrated in Fig. 1. Fig. 3 is a side elevation, partly in section, of the operator's or driving end of the machine. Fig. 4 is a plan view of that portion of the mechanism shown in Fig. 3. Fig. 5 is a detail sectional view on the line 5 5 of Fig. 4, showing the operating-cams by which power is transmitted to a portion of the saw-feeding mechanism and the trip-hammer for straightening the teeth. Fig. 6 is a detail sectional view of the same on the line 6 6 of Fig. 5 and illustrating the means for adjusting the relative position of the cam. Fig. 7 is a detail view of the eccentric-strap and connecting-arm shown in Figs. 3 and 4 and employed for operating one of the saw-clamps. Fig. 8 is a detail sectional view of the same on the line 8 8 of Fig. 7. Fig. 9 is a sectional plan view through the cutting mechanism, taken partly on the plane indicated by the line 9 9 of Fig. 3. Fig. 10 is an elevation of the cutting-die detached. Fig. 11 is a detached perspective view of the reciprocatory slide forming an intervening part of the mechanism for transmitting power to the cutter. Fig. 12 is a detached perspective view of a connecting rod or link forming a part of said mechanism. Fig. 13 is a detached perspective view of the clamping device by which the saw is held close to the cutting-die. Fig. 14 is a perspective view of the movable members of the cutter detached from the machine. Fig. 15 is an end elevation of that portion of the mechanism shown in Fig. 14. Fig. 16 is a detail view of one side of the cutter-block, the cutter-blade and its clamps being removed in order to more clearly illustrate the construction. Fig. 17 is a detail perspective view of one of the cutter-blade clamps detached. Fig. 18 is a plan view of the cutter-head proper. Fig. 19 is a transverse sectional elevation through the cutting mechanism on the line 19 19 of Fig. 9. Fig. 20 is a detached perspective view of portions of the toggle mechanism for operating the cutter. Fig. 21 is a sectional elevation through the central portion of the machine, illustrating the straightening mechanism, the die, and a portion of the saw-feeding and chip-extracting devices. Fig. 22 is a detail perspective view of the tooth-straightening bar detached from the machine. Fig. 23 is a similar view of a portion of the mechanism for adjusting the position and the extent of operative movement of the tooth-straightening device. Fig. 24 is a sectional plan view of a portion of the machine on the line 24 24 of Fig. 21. Fig. 25 is a similar view on the line 25 25 of Fig. 21. Fig. 26 is a transverse sectional elevation of a portion of the mechanism on the line 26 26 of Fig. 21. Fig. 27 is a rear elevation of a portion of the mechanism shown in Figs. 21 and 26. Fig. 28 is a side elevation of a portion of the mechanism looking in the direction of the arrow 28 of Fig. 27. Figs. 29, 30, and 31 are detached perspective views of structural details, more fully referred to hereinafter. Fig. 32 is a detached perspective view of a movable feed-segment, which serves to carry a portion of the feeding and saw-guiding devices shown in Fig. 2. Fig. 33 is a detail view of a portion of one of the adjustable saw-guides carried by the feed-segment shown in Fig. 32. Fig. 34 is a sectional plan view of one of the saw-clamping devices, the section being taken on the plane indicated by the line 34 34 of Fig. 21. Fig. 35 is a transverse sectional elevation of the same on the line 35 35 of Figs. 21 and 34. Fig. 36 is a detail sectional view on the line 36 36 of Fig. 33. Fig. 37 is an enlarged sectional elevation of a portion of the hammer-actuating mechanism. Fig. 38 is a detail sectional view of the same on the line 38 38 of Fig. 37. Fig. 39 is a similar view on the line 39 39 of Fig. 37. Fig. 40 is a detail sectional view on the line 40 40 of Fig. 1. Figs. 41 and 42 are detail views, on an enlarged scale, of a portion of one of the adjustable supports for the saw-guides.

Similar numerals of reference are employed to indicate corresponding parts throughout the several figures of the drawings.

The main frame of the machine, which for convenience is made in several parts, is indicated throughout by the reference-numeral 40 and carries at or near one end the saw receiving, feeding, straightening, and gumming mechanism and at the opposite end a single crank and power-transmitting mechanism, from which motion is transmitted to all of the moving parts of the machine.

At the foot end of the machine are two slightly-spaced T-shaped members 41, one of which forms an integral part of the frame, and the vertical legs of said members are adapted for the reception of a pivotally-mounted supporting-standard of any suitable length and adapted to rest on the floor or any other convenient point to properly support the machine in operative position.

The extreme ends of the members 41 are united by a bolt 42, carrying a spacing-block 43 at a point between the two members 41 and serving also as a support for the reception of a handle 44, which is grasped by the operator in order to steady the machine and hold the same in working position. The vertical legs of the two members 41 are provided with suitable bearings for the reception of a main shaft 45, to which is secured a handled crank 46, by which power is applied to the machine. At one end of the main shaft is secured an eccentric-gear 47, intermeshing with a similar gear 48 on a shaft 49, adapted to bearings in the frame, and to the face of the gear 48 is secured a crank-disk 50, having a crank-pin for the reception of one end of a connecting-rod 52, through which motion is transmitted to the cutting devices and to a portion of the saw-clamping mechanism in the manner hereinafter described.

On the crank-shaft 45 is secured a peripherally-grooved eccentric 53, adapted for the reception of an eccentric-strap 54 of the construction best shown in Figs. 7 and 8 and comprising two hinged members semicircular in form, one of said members carrying a pair of pivoted links 55, adapted to be secured by suitable pin or bolt to the opposite member, and thus secure the eccentric-strap in position. This construction affords a ready and convenient means of assembling and removing the parts when necessary. The eccentric-strap is secured to or formed integral with a substantially tangentially disposed arm 56, having an elongated slot 57, through which passes a pin 58, projecting laterally through one end of a rocker-arm 59, mounted on a pivot-pin 60, the latter also serving as a stay-bolt to unite the members 41 of the frame. The upper end of the rocker-arm 59 at a point above the pin 60 carries an adjustable block 61, having a pair of lugs to which is pivotally connected one end of a connecting-rod leading to a portion of the saw clamping and feeding mechanism and serving to transmit motion thereto in the manner hereinafter described.

To the shaft 45 are also secured two cams 63 and 64, each having set-screws impinging on the periphery of the shaft and serving to confine the cams in any position to which they may be adjusted. The larger cam 63 is provided with a laterally-projecting hub 65, over which extends a portion of the smaller cam 64, as indicated more clearly in Fig. 6, and the cam 64 is provided with a segmental slot 66, through which extends a securing-screw 67, the latter being adapted to a threaded opening in one face of the cam 63 and serving as an additional means for accurate adjustment of the relative angular positions of the two cams. These cams are connected by bifurcated arms 68 and 69, respectively, to portions of the operating mechanism to be presently described. This mechanism includes all that is necessary to impart motion to the various moving parts of the apparatus, and each of these is adjustable and some of the connecting parts movable to operative and inoperative positions, as will more fully appear in the description of the various devices to which they are connected.

At a point intermediate of the length of the frame the latter is provided with a depending and slightly-curved arm 70, having a laterally-projecting end portion 71 for contact with the saw-blade and serving as a guide for adjusting the machine to proper position on the saw.

At the rear end of the frame, which at this point is formed by the thin metallic strip, is formed a slot 72, having at its inner end an upwardly-extended recess for the reception of a threaded bolt 74, serving as a support and for the pivotal adjustment of a slotted plate 75. In the frame at a point below the recess 73 is a segmental slot 76, arranged concentric with the center of the recess 73, and through said slot passes a clamping-bolt 77, by which the plate 75 may be rigidly secured in any position to which it may be adjusted. This pivotal adjustment of the plate 75 is the first of a series of adjustments of which the machine is capable to accommodate the device to saws of different size, and when necessary the plate may be readily removed, together with the parts which it supports, by removing the clamping-screw 77 and after loosening the clamping-bolt 74 withdrawing the same through the slot 72 in the frame.

The plate 75 is provided with an elongated slot 78, through which extends a clamping-bolt 79, the bolt projecting on the opposite side of the frame and extending at this point through a segmental slot 80, formed in a movable segment 81, which serves as a support for a number of saw guiding, feeding, and clamping devices.

From the segment 81 projects a pivot-pin 82, threaded at its outer end for the reception of a clamp-nut 83, and on said pin is mounted a sleeve 84, secured to or formed integral with an arm 85, having at its lower end a stud 86, on which is mounted a grooved wheel 87, into which said saw-blade extends, the wheel having a lining of copper or other soft metal in order to prevent injury to the saw. On the sleeve 84 is pivoted one end of an arm 88, having at its opposite end a pivot-stud 89, on which is hung a saw-guide 90 in the form of a pair of slightly-spaced plates formed of spring-steel or other suitable metal and adapted for contact with the opposite sides of the saw-blade. This guide is maintained in normal position by means of a spring 91, secured at one end to the arm 88 and its opposite free end bearing on the upper face of the guide at a point immediately above the pivot-pin 89 and holding the guide in proper position by permitting slight movement in either direction in order not to interfere with the free movement of the saw. The arm 88 is provided with a segmental slot 92, Fig. 33, formed concentric with the pivot-pin 82, and through said slot extends a headed pin 93, preferably rectangular in form where it passes through the slot, the outer end of said pin being circular in form and threaded for the reception of a clamping-nut 94, by means of which the two arms 85 and 88 may be maintained in proper relative position. This adjustment permits of the changing of the substantially arcuate line in which the two arms are disposed in accordance with the diameter of the saw upon which the machine is to operate. The two arms are pivotally mounted on the pin or stud 82 and are free to move on said pivot to accommodate the curvature of the saw; but too free movement is prevented by the insertion of a compression-spring 95 between the inner face of the nut 83 and the arm 85. This spring serves to hold the arms in proper position in order that they may be readily adjusted to a saw and prevents their assuming a substantially horizontal position by gravity. To permit a swinging movement of the guide members, the segment 81 is recessed, as indicated at 96 97.

The adjustment of the plate 75, the similar adjustment of the bolt 79, and the adjustment of the two arms enables the machine to be used for the treatment of gin-saws of any size in use at the present time.

At a point near the upper inner end of the arm 81 is a laterally-projecting block 98, Fig. 32, and through said block is formed an opening 99 for the passage of a stud 100, which serves as a support for a clamp-lever 101, Fig. 34, arranged below said block and partly held in proper position by contact with the lower surface thereof. The inner end of the lever is provided with a screw 102, which may be adjusted laterally of said lever and is adapted to be moved into contact with one face of the saw-blade and to firmly clamp said blade against the outer face of the segment 81. As there is constant wear at this point, the screw is formed of hard metal and may be adjusted as from time to time may be necessary to compensate the wear. At the opposite end of the lever is a spindle 103, the upper portion of which extends between and is guided by a pair of lugs 104, Figs. 32 and 35, projecting from the face of the segment 81. To this spindle are secured two cams 105 and 106, each of the same contour and situated one below the lever and the other above and resting upon the upper surface of the lugs to partly support said lever. To the upper end of the spindle is secured a rocker-arm 107, Figs. 2 and 21, which is connected to the outer end of the rod 62 by means of a link 108, the link being so mounted as to permit free movement and compensate for the varying distance of the end of the rocker-arm from the surface of the segment as said arm is oscillated. Adjustment of the length of the connecting-rod 62 is provided for by forming said rod in two telescopic sections connected by an adjusting-nut 109, and the position of the rocker-arm 107 on the spindle 103 may be governed by a set-screw 110.

To the inner face of the lever 101 is secured one end of a spring-plate 111, adapted for contact with the side of the saw, the lower edge of said plate being outwardly flared, as indicated at 112, in order that the device may be readily adjusted to the saw. The lower cam 105 is adapted for contact with the plate, and the upper cam 106 makes contact with the outer face of the segment 81 or the base of the lugs 104. When the spindle is oscillated, the cams are turned in the same direction and operate at the same time, the lower cam 105 forcing the plate 111 into contact with the outer surface of the saw and at the same time effecting a corresponding inward movement of the opposite end of the lever 101 and forcing the screw 102 into contact with the saw, and thus confining the latter in position at two points. The cam 106 acts merely to maintain the spindle 103 in proper position and prevents any twisting movement which might otherwise occur or the necessity of employing an elongated bearing or bearings for the support of said spindle. In some cases the plate 111 may be dispensed with and the lower cam make direct contact with the saw; but owing to the amount of wear at this point it is preferred to employ the plate to reduce wear and at the same time obtain a larger gripping-surface for contact with the saw.

The saw-clamping movement is effected from the eccentric 53, Figs. 3 and 4, through the medium of the arm 56, the rocker-arm 59, and connecting-rod 62, and, if necessary, the clamping movement may be stopped by the movement of a spring-pressed locking-bar 115, pivotally mounted on the arm 56 and having a recess adapted to engage one side of the stud 58. The inner end of the arm 115 is adapted for contact with a plate-spring 116, carried by the eccentric-ring and bearing against two locking-faces at the ends of said arm to maintain the latter in the operative position in contact with the pin 58, as indicated by full lines in Fig. 3, or it may be moved to the inoperative position (indicated by dotted lines in Fig. 3) and held in such position by the spring. When the locking-arm is in the inoperative position indicated in dotted lines, the slotted portion 57 of the eccentric-arm 56 slides to and fro on the pin 58 without resulting in any movement of the rocker-arm 59 or the saw-clamping devices to which it is connected. In the operative position the cams 105 and 106 are turned by the spindle 103 and oscillated to alternately engage and release the saw-clamps.

In order to permit the more ready adjustment of the device to a saw, it will be noted that the plate 111 extends considerably below the adjacent clamping-surface of the segment 81, Fig. 35, so that the plate may act as a guide to properly direct the blade between the plate and segment.

On the pivot-stud 60 is mounted a T-shaped arm 68, one end of which, as previously described, is bifurcated to engage the cam 64 and said arm being oscillated on the pivot-pin as the cam rotates. This arm has a depending member 68', to the lower end of which extends a lug 118, threaded for the reception of a screw 119, having a recessed upper end for the support of a screw 121, the screw 119 being adjustable and maintained in its adjusted position by a locking-nut 122. The upper portion of the screw 121 is unthreaded and passes through a guiding-opening in the arm 68 at a point near the pivot-pin 60, while the extreme upper end of said screw is a milled knob 123, by which the screw may be turned. The screw passes through a nut 124 in the form of a block having a recessed rear face guided by the member 68' of the arm 68 and provided with a pair of forwardly-extending lugs having a pivot-pin 125, to which is connected one end of a link 127, the opposite end of which is secured to the block 98 of the segment 81 by means of a screw 128, Figs. 2 and 3. In the end of the link is a plurality of openings 129, through any one of which the securing-screw may be passed in order to adjust the distance between the segment 81 and the nut 124.

As the cam 64 is rotated the arm 68 is operated, and the movement is transmitted by means of the nut 124 and link 126 to the segment 81, the latter being drawn back and forth on the guiding-pin 79 for a distance approximately equal to the distance between the teeth of the saw being dressed. The extent of this feeding movement may be accurately adjusted by turning the screw 121, and thus moving the nut 124 to a greater or less distance from the center of rocking movement represented by the pivot-pin 60, the greater the distance of the nut from the pivot-pin the greater the extent of feed, and vice versa. This movement may be properly timed by the adjustment of the cam 64 on its shaft in the manner previously described.

In the operation of the mechanism thus far described the parts are so timed that after the eccentric 53 acts indirectly on the spindle 103 and its connecting-cams to clamp the saw against the segment the cam 64 will act to draw the segment forward in the direction of the crank-shaft, the movement thus imparted being to the extent of a single tooth of the saw. It will be noticed that the cams 105 and 106 have an extensive gripping-surface, this being for the purpose of permitting the continued forward movement of the rod 62 and the clamping devices as the segment is moved to effect the feed, the saw being firmly held and clamped in place during all of the feeding movement. Immediately the feed is accomplished the eccentric moves to release the cams, and following this operation the cam 64 acts to return the segment and clamps to initial position, the saw being meantime held by an additional clamping mechanism, as hereinafter described.

*The cutting mechanism.*—To the main frame is secured a female die 131, Figs. 9, 10, and 21, which is preferably in the form of a disk, having a central opening for the passage of a securing-bolt 132, which will permit of the adjustment of the disk and its locking in any desired position. For the sake of convenience the disk is provided with a plurality of dies 133, which may be of the same or of different size and any one of which may be adjusted to operative position opposite a chip-discharging notch 134, Fig. 9, formed inside of the frame.

To the main frame is pivoted a cutter-lever 135, the connection being preferably in the form of a rule-joint and the parts being united by a bolt 136 in order to insure accuracy of adjustment. At the end of the lever is a cutter-head 137, Figs. 14 to 18, having in one face an angular slot 138 for the reception of a male die member 139, which is preferably in the form of a bar of hardened steel having cutting-dies at each end, so that one may be substituted for the other in case of accident or should the cutting edge become worn. The die member 139 has a flat face resting against the inner wall of the slot and is confined in place by a securing-bolt of the peculiar construction best shown in Fig. 17. The bolt 140 is provided with a recess 141 for the reception of the cutting-bar, and at its outer end is a head having a semicircular portion 142 fitting within a correspondingly-shaped recess in the cutter-head, said recess being continued through the head in the form of an opening, through which the threaded end of the bolt extends to the opposite side of the head and is there provided with a suitable lock-nut 143. The cutting of the recess 141 results in the formation of a shoulder 144, which engages the outer wall of the cutter-bar and when the nut is tightened serves to draw said cutter-bar firmly within the slot. The outer surface of the head of the securing-bolt is faced off at an angle, as indicated at 145, said surface being flush with a corresponding angular surface 146 on an adjacent portion of the cutter-head, for a purpose hereinafter described. The width of the slot 138 is a trifle greater than the thickness of the cutter-bar to facilitate adjustment, and in the rear portion of the cutter-head is a threaded opening for the reception of an adjusting and clamping screw 148, which makes contact with the rear face of the cutter and may be turned to an extent sufficient to force the front face of the cutter-bar in contact with the front wall of the slot. As most of the strain during the cutting operation comes opposite the cutting-point, it is desirable to provide means for reinforcing and holding the cutter-bar at this point as well as to provide means for the adjustment of a worn cutter-bar. For this purpose I employ two adjusting-screws 148' and 149, (see dotted lines in Fig. 15,) extending through the cutter-head, the screw 148' making contact with the cutter-bar at the end of the cutting edge and the screw 149 coming in contact with the bar at the angle formed by the juncture of the straight and inclined faces.

On the outer face of the cutter-lever 135 is a slotted plate 150, Figs. 9 and 20, and through the slots pass suitable securing-screws into threaded openings in the side of the lever to permit of longitudinal adjustment of the plate when it becomes necessary to compensate for wear. Projecting from this plate is a toggle-pin 151, on which is pivoted the enlarged head 152, Figs. 2 and 9, of a toggle-lever 153, the head 152 having an inclined face 154, adapted to make contact with a corresponding inclined face 155 on the plate 150 during the inward or cutting movement of the lever and cutter-block. The lever 153 extends across and in contact with the upper surface of the cutter-lever and the adjacent portion of the supporting-frame and at its outer end is provided with a number of openings 156, Figs. 9 and 14, through which may pass a securing-pin 157 for connecting the lever to a link 158 and thence to the connecting-rod 52 and crank-disk 50 for the transmission of power to the toggle-lever. In the head 152 of the toggle-lever is an opening 160 for the passage of a securing-bolt 160', which serves to connect one end of a pair of links 161 and 162 to the lever. The opposite ends of the links are connected to the main frame 40 by a pivot-bolt 163. These two links serve as a fulcrum for the movement of the toggle-lever and also act as guides to prevent any vertical movement of the cutting-lever. The cutter-lever is further held from downward movement by the flat lower surface of the cutter-head, which rests on the upper surface of the frame 40 at a point slightly to the rear of the cutter-bar.

Secured to the outer surface of the frame 40 are two dovetailed blocks 164, fitting in correspondingly-shaped slots in a sliding plate 165, which is moved to and fro during the operation of the machine. From the plate 165 projects a block 166, having a recessed end for the reception of the rounded end of the connecting-rod 52 in order to relieve the connecting-bolt 167 of a portion of the strain. The link 158 has a rounded portion seated in a recess 168 in the block 166 for a similar purpose and at its opposite end is bifurcated for the reception of the end of the toggle-lever. It is obvious that on a movement of the block 166 toward the left of Fig. 9 the pivot 160' will form a fulcrum-point for the movement of the toggle-lever 153, and that this movement will be transmitted through the pin 151 and plate 150 to the cutter-bar 135, causing the male die 139 to enter the female die 131.

The cutter-lever is actuated from the main shaft through the eccentric-gears 47 and 48, through the crank-disk 50, and the intervening mechanism just described, and in this connection it will be noted that during the cutting movement of the die members that portion of the driving-gear 47 of shortest radius is intermeshed with that portion of the transmission-gear 48 of longest radius, so that the operator is thus enabled by the increase in leverage to exert the driving force to the best advantage. This movement takes place slowly, and in addition to the advantage resulting from the increase in leverage the increase of time taken to perform this part of the operation permits the better operation of other connected portions of the mechanism, as will more fully appear hereinafter.

The lever 69, which is bifurcated for the reception of the power-transmitting cam 63, is of considerable length and extends along the left-hand side of the machine to the parts which it is to operate. For purposes of convenience this lever is provided with an upwardly-extending arm 170, extending into suitable recesses in the adjacent faces of the frame and cutter-lever 135, as shown in Fig. 9, and there pivoted to the frame on a bolt 171.

The saw-clamp, Figs. 9 and 13, is formed of two members 173 and 174, the latter being pivoted on the lower portion of the bolt 136, which unites the cutter-lever to the frame. To permit adjustment for saws of varying thickness, as well as to compensate for wear, the two members 173 and 174 are connected in the following manner: A securing-screw 175 extends through threaded openings in a webbed or flanged portion of both members, and at one side of the securing-screw is a second screw 176, on which is a washer or spacing-collar 177 between the two members. An additional screw 178 is carried by a threaded opening in the member 173 and impinges on the web or flange of the member 174, thereby serving to adjust the clamping-head 179 to proper position. This clamping-head is located immediately in front of the die 131 and in operation firmly clamps the saw against the die and holds the same during the operation of the cutter. The second member 174 of the clamp is provided with an antifriction-roller 180, adapted for engagement with a plate 181, secured to the outer face of the reciprocating bar or plate 165, said plate 181 having an inclined or beveled end 182, Fig. 11, which engages with the roller as the plate is moved in the direction of the die and serves to move the clamping-head to saw-engaging position. As an additional support for the clamp the member 174 is provided with a slot 183, through which passes a screw or bolt into a threaded opening in the lower portion of the frame 40, the bolt-head affording a support for the clamp. Excessive movement of the clamp is prevented by a screw 184, passing through a threaded opening in a lug 185 on the clamp member 174 and serving as a stop to limit the outward movement of the clamp. The clamp is moved to disengaging position by a compression-spring 186, extending between an arm 187 on the member 173 and the pivot-arm 170, before referred to.

The operation of the mechanism is such that as the saw-clamps controlled by the cams 105 and 106 on the segment are moving to releasing position the saw-clamps adjacent to the cutter will be operated and firmly clamp and hold the saw in place during the return movement of the clamps and guides carried by the segment 81. After the plate 165 has started its movement the clamp-actuating plate 181, Figs. 9 and 11, engages the antifriction-roller and moves the clamp to saw-engaging position. Before this movement the cutter-bar is spaced from the die 131 a distance sufficient to permit the free feeding of the saw by the feeding-segment 81; but immediately after the feeding movement stops and the second clamp engages the saw the further movement of the plate 165 toward the left of Fig. 9 causes the toggle-lever to move the cutter-head and cutter-bar in the direction of the die 131 and remove the metal of the saw in front of the die. The amount of material removed from the saw will depend on the shape and size of the teeth, and the cutter may be operated to reshape old or worn teeth, to deepen the indentures or gullets between teeth, or to cut spaces for the formation of new teeth, as may be required.

The die 131, which has been previously referred to, must be adjusted with the utmost accuracy in order to gain the best results, and to assist in adjusting the die on its central securing-bolt and as an initial means for clamping and holding the same in position I employ a curved bar 188, Fig. 21, having a slot 189 arranged substantially on the arc of a circle struck from the center of the die, and through said slot passes a clamping-screw 190 for securing the bar in any position to which it may be adjusted. Near one end of the curved bar is a tooth 191, which enters one of the female cutting-dies on the disk, and at the opposite end of said bar at a point about diametrically opposite to the tooth is a clamping-screw 192, which engages the perimeter of the disk and serves to clamp the same firmly in place.

*The tooth-straightening mechanism.*—On one of the frame members is pivoted a block 194, having a depending arm 195, Figs. 21 and 22, said block being slotted and serving as a guide for a longitudinally-movable bar 196. The lower end of the bar is bifurcated, forming an inclined slot 197, adapted to embrace the opposite sides of the saw-teeth, and at the point of bifurcation the bar is inclined, as shown at 198, to extend down into the indentures between the saw-teeth. To the rear face of this bar is secured a plate 199, the bifurcated end inclined in a similar manner, as indicated at 200, the inclined face of the plate being to the rear of and above the inclined portion 198 and forming a recess for engagement with the points of the teeth as the latter are consecutively fed under the bar. The lower portion of the bar and plate is adapted to a guideway formed by a forward extension of the depending arm 195 and serving as a guide for one side of the bar. To the side bar is secured a plate 201, encircling the rear face on the opposite side of the bar, as shown more clearly in Fig. 21. Adjustment of the bar with relation to its guide may be secured by a screw 202, extending through the bar and bearing on the adjacent face of the plate 201, and the bar is held in an elevated position out of contact with the saw during the feeding operation by a spring 203, connected at one end to the movable bar and at the opposite end to the depending arm 195, the latter being provided with a plurality of openings 204, into any one of which the end of the spring may be inserted for the purpose of altering the stress of the spring.

In order to adjust the position of the bar to correspond with the circumferential row of teeth on the saw, I employ a bell-crank lever 205, centrally mounted on the pivot-pin 206, on which the block 194 is hung. One arm of the bell-crank lever is connected to the side bar forming a part of the depending arm 195, and at the opposite end of the lever is a swiveled pin 208, having a threaded opening for the reception of the threaded end of a cam 209, fulcrumed on a pin 210 on a part of the framework. On the threaded portion is an adjusting-nut 211, by which the position of the bell-crank lever may be adjusted and the angular position of the straightening-bar and its guides adjusted with the pivot-pin 206 as a center until the desired position is attained. The upward movement of the bar and its downward movement to tooth-engaging position are under the control of a presser-foot 215, having a slot 216 for engaging the pin 202. The presser-foot is in the form of a spring-steel plate having at its upper end an enlarged head provided with a threaded opening for the reception of an adjusting-screw 217, the stem of which passes through an opening in a lug 218, projecting rearwardly from a plate 219, hereinafter described. The presser-foot is held down by means of a coiled compressing-spring 220, encircling the stem of the screw and extending between the head of the presser-foot and the face of the lug 218, while its vertical position is determined by means of the screw. Adjustment of the screw regulates also the vertical position of the straightening-bar, the upward movement of the presser-foot permitting a corresponding upward movement of the straightening-bar until the screw or pin 202 of the latter comes into engagement with the upper end of the slot 216 in the presser-foot. The presser-foot is held in engagement with the bar by means of a plate-spring 221, which will permit a slight yielding movement of the straightening-bar in order that the latter may in a measure feel its way to the tooth and guide the tooth accurately into the recess 200.

The plate 219 is guided on a stationary plate 222, secured to the fixed frame, and on one side of the plate 219 is a screw or bolt 223, which serves as a means of securing an operating-lever 224 to said plate. The lower end of the lever 224 is pivotally connected to the rear end of the cam-actuated bar 69, previously described, and as the cam is revolved this lever transmits a longitudinally-reciprocating movement to the plate 219. On the downward movement of the plate 219 the straightening-bar is carried in its guides down to tooth-engaging position, the movement being a yielding one owing to the presence of the spring 220, and the bar is thus guided until the tooth is properly engaged, and the bar is then in position to receive a blow from an actuating-hammer, by which the tooth if bent or otherwise distorted is straightened out between the arms forming the bifurcated lower end of the bar.

The hammer is of the trip type and is provided with a head 225 of a weight suitable for the purpose, said head being secured in position on the handle by means of a suitable nut in order that a head of greater or less weight may be substituted in accordance with the character of the work to be performed. The hammer-handle is secured to a sleeve 227, pivotally mounted on studs 228, adapted to threaded openings in a pair of links 229 and confined in position by lock-nuts 230. These links are rigidly held in position by a pair of bolts 231, extending through a portion of the framework and held in spaced relation by suitable collars or washers surrounding the bolts. At one end of the sleeve or block 227 is an enlarged head having a flatted portion 232, with which may engage a bifurcated spring 233, formed of heavy spring metal and pivoted at the point of bifurcation on the stud 210, previously referred to. One arm of the spring is perforated for the passage of a threaded bolt 234, pivoted on one of the link-supporting bolts 231, and at the upper end of this bolt is a threaded nut 235, by which the stress of the spring may be adjusted.

The under side of the enlarged head of the block 227 is cut away to form a shoulder 236, Fig. 37, adapted to be engaged by a catch 237, forming part of a bar 238, the latter being connected by a bell-crank lever 239 to a vertically-movable arm or lever 224 and receiving movement immediately after the plate 219 has been depressed to move the straightening-bar into contact with the tooth.

In the pivot-block is an adjustable screw 240, and in the end of the bar 238 is a similar screw 241, these being for the purpose of effecting the disengagement of the catch 237 from the shoulder 236 when the bar in traveling in the direction of the arrow has moved the pivot-block 227 to the position indicated in Fig. 37. When the catch is disengaged, the pivoted block has been turned to such position as to elevate a hammer-head above the top of the straightening-bar, and the flat surface 232 is then at an angle to the under surface of the spring 233. On the release of the catch the spring immediately exercises a camming effect on the block 227 and rotates the latter until the flat face 232 reassumes its normal position in contact with the spring. This movement results in a forcible blow of the hammer-head on the upper end of the straightening-bar, and the latter is driven into contact with the tooth and straightens the latter if bent or otherwise distorted. In connection with this portion of the mechanism it may be observed that the guiding-block 194 of the straightening-bar serves as a support for a swiveled block 244, through which passes one end of an inclined bar 245, carried by an arm 246, projecting laterally from the segment 81. The bar 245, Fig. 21, serves as a support for a helical compression-spring 247, the upper end of which bears against the block 244 and the lower end against an adjusting-nut 248, adapted to a threaded portion of the bar and serving to adjust the stress of the spring. This spring serves to force the segment back and down into proper position when the saw-clamps are returning to an initial position, and the position of the segment in this respect is further aided by the pivot-point of said segment, which is so situated as to bring a portion of the weight in advance of the pivot.

*The chip-extractor and auxiliary feed.*—At a point in advance of the straightening mechanism is a plate 222, secured rigidly to the supporting-frame by two sets of screws or bolts 250 and 251. The plate 222 is provided with an elongated slot 253, into which projects a rib 254, formed integral with the plate 219, previously referred to, and the plate 219 and its rib are secured to an auxiliary plate 255 by means of screws 256 and 257, so that both plates move longitudinally with the plate 222 as a guide when motion is imparted by the lever 224. As an additional guide the plate 222 is provided with a rib 258, entering a slot 259 in the plate 255.

The lower end of the plate 222 has an inclined slot for the reception of a vertically-movable bar 260, having an inclined rear face to permit the passage of the saw, the teeth of the latter extending through the slot. The rear portion of the bar is of considerable width, as shown in Fig. 27, and is provided with a vertically-disposed slot 261, through which extends a screw or pin 262, forming a guide to assist in holding the bar in proper position. The upper end of the bar 260 is rounded and provided with threads adapted to enter a threaded opening in the lower portion of a swiveled spindle 263, carried by a lug 264 on the rear of the plate 222. The upper end of the spindle is provided with a milled knob, which may be turned to regulate the vertical position of the bar.

To the longitudinally-movable plate 255 is secured a plate 266, said plates being separated to some extent and being provided with a pivot-pin 267 for the reception of a toothed segment 268, which is mounted between plates and provided with a series of ratchet-teeth on its segmental face. From the lower portion of the segment extends an approximately horizontal arm 269, having in its lower face a plurality of notches for the reception of the lower end of a spring 270, the upper end of which is secured to a screw or pin 271, projecting from the stationary plate 222. The spring tends normally to force the segment in the direction indicated by the arrow in Fig. 26, excessive movement being prevented by an antifriction roller or pin 272, extending between the two plates 255 and 266 and engaging the curved arm of the segment.

In the upper portion of the plate 222 is an opening for the reception of a spindle 273, having a cam or offset portion 274 at a point between the two plates 255 and 266 and forming a cam which may be moved into engagement with a plurality of pawls 275, mounted on a pin 276, carried by the plates. These pawls are adapted to engage with the ratchet-teeth of the segment and may be held out of operable position by springs 277 when the cam 274 is moved to the position shown in Fig. 26. This movement of the pawls is further assisted by a spring 278, extending between a fixed point and an arm 279, to which one end of the springs 277 is secured. The spindle 273 is provided at its rear end with a dished washer 280, adapted to turn with the spindle and held in place by a screw 281 and collar 282. The outer portion of the spindle is threaded and is provided with a transversely-disposed pin 283 for convenience in turning the spindle to adjust the position of the cam and the cam being stopped at either of its limits of movement by a pin 284 projecting from the rear face of the plate 222 and adapted to be engaged by shoulders formed at diametrically opposite points on the washer 280, as shown in Fig. 27. The spindle 273 serves as a pivot-point for the upper end of a lever 285, arranged in front of the plate 266 and partly held thereto by a nut 286 on the threaded portion of the spindle. The upper end of the lever is slotted at this point in order to permit free vertical as well as oscillatory movement of said lever.

To the lower portion of the segment 268, at a point near the pivot-pin 267, is pivoted the lower end of a link 287, having its upper end provided with a pin 288, projecting through a slot 289 in the lever 285 and confined in place in the slot by a lock-nut 290 on the threaded end of the pin 288, the connection being such that the pin is locked firmly to the lever, but is free for circumferential movement in the upper portion of the link. The lever occupies a position immediately above the female die in use, and its position with respect to such die is governed by a screw 291, extending through the lever and bearing against the front face of the plate 255, the arrangement being such that when it becomes necessary to move the lever out of operative position it may be swung, with the spindle 273 as a center, until the adjusting-screw is slightly beyond the edge of said plate, said lever being there held by means of a bent spring 292 extending between the lever and a suitable recess in link 287 a little to the left and horizontally to the pivot-point of the link, this spring having a constant tendency to draw the lever to the right or to that side of the machine shown in Fig. 2.

To the lever 285 is secured a pointed arm 293, the arm and lever being connected by suitable securing-screws 294, which will permit of adjustment of the relative positions of the arm and lever. This arm has a double function, in that it acts partly as an auxiliary feed for the saw and as an extractor for removing from the female die any metal which may have been cut from the saw.

At the lower end of the stationary plate 222 is secured a wedge-shaped block 295, which is arranged at a point immediately above the die, and to the lower end of the movable plate 255 is secured a spring-tongue 296, terminating in an enlarged head 297, which is forced outwardly by engagement with the wedge-block 295 on the downward movement of the plate. The result of this movement is to force the lever 285 outward to a slight extent, the lower rear surface of said plate coming in contact with the head 297 and moving the depending extractor-arm 293 outwardly into proper position to enter the female die.

Excessive outward movement of the arm is prevented by an adjustable screw 298, carried by the enlarged head 142 of the male-die-clamping bolt 141, said screw coming into contact with the front face of the arm at each downward movement. On the proper adjustment of this screw and the block 295 depends the proper movement of the auxiliary feed and chip-extracting finger, these parts being adjusted so that on the downward movement of the finger it will properly enter the indentation between two adjacent teeth and center the same with respect to the adjacent opening of the female die and in readiness for the operation of the saw-clamp and male die.

The extracting arm or finger is normally drawn away from the left-hand side of the machine by springs 270 and 292, and as it is moved downward through the connection between the quadrant 268 and the link 287 it will first come into contact with the side of the male die which at this time has not been moved to cutting position and is gradually guided into engagement with the saw. When the extracting-finger comes into engagement with the bottom of the interdental space between the two teeth, there will be a slight checking of its downward movement; but afterward the spring 270 will yield and allow the toothed portion of the quadrant to swing around in the direction of the pawls 275 until the teeth come into engagement with the pawls, after which the movement is positive and the finger moves the saw to proper position with respect to the lowest portion of the female die, after which the saw-clamp 179, adjacent to the die, is moved to clamping position and the cutter-head is then moved in the direction of the extractor, any of the material of the saw between the dies being severed and forced into the female die. The point of engagement of the pawls 265 with the teeth of the segment may be regulated by means of the cam 274, said cam being turned in the desired direction to permit a greater or less yieldable movement of the extracting and centering finger before the latter is positively locked, or by adjusting the cam to its fullest extent the movement of the extracting and centering finger may be made positive throughout all or nearly all of its range of movement. The cutting-die has a considerable range of movement, and any chip cut from the saw is forced for a considerable distance into the die 133, so that at each downward movement of the extractor there will be sufficient space between a previously-cut chip and the adjacent face of the male die to permit the entrance of the extractor, so that on the subsequent outward movement of the latter by the cutter-head the chip will be forced out through the notch or slot formed in the frame in alinement with the female die and cannot come into contact with the saw or remain in the die.

The oscillatory movement of the extractor is effected principally by a tappet 299, adjustably secured to the top of the cutter-head, as shown in Fig. 14, and adapted to be moved against the extractor at each inward movement of the cutter-head. The return movement of the extractor occurs while it is still in contact with the tappet, the latter receiving a very slow movement, owing to the contact of the smallest radius of the gear-wheel 47 with the largest gear-wheel 48 during the cutting movement, while the extractor receives a comparatively quick movement from the cam 63 through the medium of the arm 69 and its connections.

In operation, the machine having been adjusted to the saw, the operator holds the driving end steady by grasping the handle 44 and then turns the crank 46 to set the machine in operation. On the initial movement the cam 105 will be operated through the rod 62 and eccentric to clamp the saw, and immediately thereafter the cam 64 will operate the bar 68 and connecting-rod 126 to effect a forward movement of the segment 81 and the clamps and saw-guides carried thereby. The straightening-bar 196 is then moved down and receives a blow from the hammer; but in advance of the hammer-blow and after the release of the feeding device the extractor and feed-finger 293 descends and feeds the saw to proper position, after which the saw is clamped by the clamping-head 179 in advance of the hammer-blow. During the releasing movement of the cams 105 and 106 the cutting action takes place. The segment 81 and the clamps and saw-guides carried thereby are returned to initial position while the clamping-head 179 is holding the saw at a point adjacent to the cutting-die, and before this clamping-head is released the cutting-die has been returned to initial position, the straightening-bar 196 has been raised, and the cams 105 and 106 have again clamped the saw for a second feeding movement.

The feeding movement during the time the saw is clamped by the cams 105 and 106 is regulated by the screw 123, and any desired extent of movement may be obtained. The movement of the saw is corrected in accordance with any inequalities in the size of the teeth or the spacing thereof by means of the straightening-bar 196, and the centralizing of the saw relatively to the cutting-dies is accomplished by the auxiliary feed and extracting finger 293.

It will be observed that every part of the machine is adjustable in order that the guides and saw-clamps may accommodate a saw of any diameter, that the extent of feed may be adjusted in accordance with the space between the teeth, and the depth of cut regulated to suit any special requirements. As previously described, the mechanisms may be independently thrown into and out of operation or, in other words, connected to and disconnected from the main shaft in order that one or more of such mechanisms may be operated independently of the others—as, for instance, by adjusting the arm 115 to the dotted-line position shown in Fig. 3 the saw-feeding mechanism will be thrown out of operation, while the remaining portion of the mechanism may act. By disconnecting or removing the pin 157 the male cutting-die may be held from operative movement without interfering with the remaining portions. The extracting and centering finger may be swung with the spindle 273 as a center until the adjusting-screw 291 is moved beyond the left-hand side of the bar 259, and thus hold the finger from operative movement, and the strength of the hammer-blow may be regulated, as previously described, in accordance with the character of the work.

While the construction herein described, and illustrated in the accompanying drawings, is the preferred form of the device, it is obvious that various changes in the form, proportions, size, and minor details of structure may be made without departing from the spirit or sacrificing any of the advantages of the invention.

Having thus described my invention, what I claim is—

1. The combination with saw - treating mechanism, of a clamping device adapted to engage with opposite sides of the saw and feed the saw through successive angular distances, an auxiliary clamp adapted to engage with and hold the saw between feeding movements, and means for correcting the feed in advance of the movement of the clamp.

2. The combination with saw - treating mechanism, of two sets of clamps movable into positive engagement with opposite sides of the saw, means for moving one set of clamps to feed the saw and for releasing and returning said clamps to initial position at the completion of each feeding movement, means for moving the second clamps to saw-engaging position between intervals of feeding, and means for correcting the feed in advance of the movement of the second clamp.

3. The combination with saw - treating mechanism, of a feeding-clamp movable into and out of engagement with opposite sides of the saw, a cam for moving the clamp into saw-engaging position, means for actuating the cam, a feeding-clamp carrier, means for operating the same to feed the saw, and an auxiliary clamp for engaging with and holding the saw between intervals of feeding.

4. The combination with saw - treating mechanism, of a feeding - clamp, a carrier therefor, a spindle, a pair of cams carried by the spindle and adapted to engage both the clamp and its carrier, means for moving the carrier and clamp to effect the feeding of the saw, and an auxiliary clamping device for holding the saw between intervals of feeding.

5. The combination with saw - treating mechanism, of a clamp-carrier, a clamping-arm pivotally connected thereto, a spring-plate carried by the arm and forming one of the clamping elements, a spindle mounted in a guiding-opening in the arm, a pair of cams carried by the spindle and adapted to move both the plate and arm to saw-clamping position, means for moving the carrier and arm to effect the feeding of the saw, and means for holding the saw between intervals of feeding.

6. The combination with saw - treating mechanism, of a clamp-carrier, a clamping-arm pivotally connected thereto, a spring-plate secured at one end of the clamping-arm and having a depending ontwardly-flared portion extending below the carrier, a cam for moving both the plate and arm into engagement with the saw, means for moving the carrier and clamp to effect the feeding of the saw, and means for holding the saw between intervals of feeding.

7. The combination with saw - treating mechanism, of a clamp-carrier, a lug or block extending therefrom, a clamping-arm pivoted at an intermediate point to the block, a spring-plate carried by the arm and forming one of the clamping elements, a spindle mounted in the arm, cams carried by said spindle and adapted to engage respectively with the carrier and the spring-plate, an auxiliary spindle-guide projecting from the carrier, means for effecting a rocking movement of the arm and spring-plate to move the spindle to saw engaging and disengaging positions, means for moving the carrier and clamp to effect the feeding of the saw, and mechanism for holding the saw between intervals of feeding.

8. The combination with saw-treating mechanism, of a clamp-carrier, means for operating the same, and a clamp-actuating device comprising an eccentric, means for operating the eccentric, an eccentric-strap having a slotted arm, a locking-arm, a stud projecting from the arm and engaging the slotted eccentric-arm, and means for locking the stud in operative position, substantially as specified.

9. The combination with saw-treating mechanism, of a clamp-carrier, means for operating the same, a clamping device arranged on said carrier, a revoluble eccentric, an eccentric-strap having a slotted arm connected thereto, a rocking lever forming an operative connection between the eccentric-strap and the clamp, a stud carried by said lever and engaging said slotted arm, and a stud-engaging lever carried by the eccentric and adjustable to operative and inoperative positions with relation to said stud, substantially as specified.

10. The combination with saw-treating mechanism, of a clamp-carrier, a saw-clamp carried thereby, a cam, means for operating the same, a rock-lever having a plurality of arms one of which is operable by the cam, a nut adjustable longitudinally of a second arm and lever, and means for operatively connecting the nut to the clamp-carrier.

11. The combination with saw-treating mechanism, of a clamp-carrier, a clamp carried thereby, means for positively operating the clamp to engage the saw and for operating the carrier, and means for adjusting the carrier-operating mechanism.

12. The combination with saw-treating mechanism, of a clamp-carrier, a clamp carried thereby, means for operating the clamp, a rocker-arm, a nut or block adjustable longitudinally of the arm, and means for connecting said nut or block to the clamp-carrier.

13. The combination with saw-treating mechanism, of a clamp-carrier, and a clamp-carrier-operating mechanism comprising a rocker-arm, a threaded spindle carried thereby, a nut guided by the arm and threaded for the reception of the threaded portion of the spindle, and a connecting-rod extending from the nut to the carrier.

14. The combination with saw-treating mechanism, of a clamp-carrier, a clamp carried thereby, means for positively moving the clamp to saw-engaging position, means for moving both the clamp and carrier while in saw-engaging position to effect the feeding of the saw, and means for releasing the clamp from the saw and returning the several mechanisms to initial position after each feeding movement.

15. The combination with saw-treating mechanism, of a clamp-carrier, a saw-clamp carried thereby, means for operating the saw-clamp, a rocker-arm having two members, a cam engaging one of the members, a screw mounted in the opposite member, a nut guided by said opposite member and provided with threads for the reception of the screw, and a connecting-rod adjustably connected to the nut and the carrier.

16. The combination with saw-treating mechanism, of a guided segment, saw-clamping mechanism carried thereby, and a plurality of saw-guides carried by the segment and engaging with the saw in advance of the clamps.

17. The combination with saw-treating mechanism, of a guided segment, saw-clamps carried thereby, means for operating the saw-clamps, and a pair of pivotally-mounted saw-guides carried by the segment and adapted to engage with the saw.

18. The combination with saw-treating mechanism, of a pair of adjustable arms having a common pivot-point, and saw-guiding devices arranged one at the end of each of said arms.

19. The combination with saw-treating mechanism, of a saw-guiding device comprising a pair of arms, a pivot-stud to which both of the arms are connected, means for adjusting the relative positions of the two arms, and a saw-guide arranged at the outer end of each of said arms.

20. The combination with saw-treating mechanism, of a saw-guiding device comprising a pivot-stud, an arm having a hub portion mounted on the stud, the hub being arranged at a point intermediate of the ends of the arm, a second arm swiveled on the hub of the first and provided with a segmental slot, a locking-bolt carried by the first arm and extending through said slot, a lock-nut carried by the bolt for holding the arms in adjusted position, and saw-guides mounted one at the outer end of each of said arms.

21. The combination with saw-treating mechanism, of a pivot-stud, an arm having a hub portion mounted on the stud, said hub being at a point intermediate of the length of the arm, a compression-spring mounted on the stud and engaging the arm, a nut adapted to a threaded portion of the stud and serving as a means of compressing the spring, a second arm secured to the hub of the first and provided with a segmental slot, a locking-bolt carried by the first arm and extending through said slot, and saw-guides mounted one at the outer end of each of said arms.

22. The combination with saw-treating mechanism, of a saw-guide comprising a pair of pivotally-mounted arms, a grooved wheel mounted at the outer end of one of said arms and adapted to engage the saw, a second guide formed of a pair of spring-plates swiveled at the outer end of the second arm and engaging the saw, and a spring for maintaining the second guide in proper position.

23. The combination with saw-treating mechanism, of a grooved segment, saw clamping and guiding devices carried thereby, a stud extending through the groove of the segment and forming a guide therefor, a slotted plate in which said stud is adjustably secured, and means for adjusting the position of the plate and for locking the same in adjusted position.

24. The combination with saw-treating mechanism, of a grooved segment, saw clamping and guiding devices carried thereby, a stud extending through the slot of the segment and forming a guide therefor, a slotted plate in which the stud is adjustably secured, a supporting-frame having a segmental slot, and means for adjustably securing the plate to the slotted portion of the frame, substantially as specified.

25. The combination with saw-treating mechanism, of a segment mounted for oscillatory and rocking movement, saw-guides arranged near one end of the segment, saw-clamping devices arranged near the opposite upper end of the segment, and an auxiliary spring tending to force the segment into engagement with the saw at a point adjacent to the saw-clamps.

26. In a device of the class specified, a die member comprising a circumferentially-adjustable disk, a supporting-frame therefor, a curved bar adjustably secured to the frame, and disk-engaging members carried by said arm.

27. In a device of the class specified, a plural die comprising a circumferentially-adjustable disk having a plurality of female dies, a supporting-frame for the dies, a curved and slotted bar, a securing-screw extending through said slot to the frame, a tooth carried by said bar and adapted to engage in one of the dies, and a clamping-screw carried by said bar and adapted to engage the periphery of the disk.

28. In a device of the class specified, the combination with a female die, of a pivoted arm, means for operating the same, a male die comprising an adjustable bar carried by said arm, and adjusting and bracing screws carried by the arm and adapted to engage with the cutter-bar at points in the line of thrust when the cutter-bar is being forced through the saw.

29. In a device of the class specified, the combination with a female die, of a cutter-bar, a support therefor, and adjustable bracing-screws carried by the support and engaging with the cutter-bar at points in direct alinement with the cutting edge thereof.

30. In a device of the class specified, the combination with a female die, of a slotted and recessed cutter-head, a recessed bolt carried by the cutter-head and engaging the bar, a lock-nut for holding the bar in adjusted position, and adjustable bracing-screws carried by the cutter-head and adapted to engage the cutter-bar at points in alinement with the cutting edge of said bar, substantially as specified.

31. The combination with a female die, of a supporting-frame, a cutter-bar pivoted in said frame, a cutter-head carried by the bar and guided in part by the frame, a toggle-lever pivotally connected to the cutter-bar, links connecting the toggle-lever to the frame, a cutter-bar carried by the cutter-head, and means for actuating the toggle-lever.

32. The combination with the frame, of a female die carried thereby, a cutter-bar pivoted to said frame, a cutter-head carried by the bar and extending over the upper portion of the frame, a cutter carried by the head and forming a male die, links connecting the cutter-bar to the frame and serving partly as guides for said cutter-bar, a toggle-lever having a pivotal connection with the links and with the cutter-bar, and eccentric gearing for transmitting power to said toggle-lever.

33. The combination with the frame, of the female die carried thereby, an arm pivoted to the frame, a cutter-bar supported thereby and forming a male die, an adjustable plate secured to the arm and provided with a projecting pivot-pintle, a toggle-lever fulcrumed on the pintle, a pair of links pivotally connecting the toggle-lever and the frame, and means for operating said toggle-lever, substantially as specified.

34. The combination with the frame, of a female die carried thereby, a saw-clamp located adjacent to the die, an arm pivoted to the frame, a cutter-bar carried by the arm, a toggle-lever for operating said arm, a reciprocating slide guided on the frame, means for reciprocating said slide, and means operatively connecting the slide to the clamp and the toggle-lever for effecting the successive operation of the same.

35. The combination with the frame, of a female die, an arm pivoted to the frame, a cutter-bar carried by said arm, means for operating the arm, a clamp adapted to engage the saw at a point adjacent to the female die, a reciprocating slide guided on the frame, means for operating the slide, and a roller operatively connected to the clamp and adapted to be operated on by the slide to move the clamp to saw-engaging position.

36. The combination with the frame, of a female die, a pivoted frame, a saw-clamp carried thereby at a point adjacent to the die, an antifriction-roller carried by said frame, a male die, a carrier therefor, a reciprocating slide guided on the frame and adapted to act on the antifriction-roller to move the clamp to engaging position, means operatively connecting the slide to the male-die carrier, and mechanism for operating said slide.

37. The combination with the frame, of a female die, a clamp adjacent to the die, a clamp-supporting frame pivoted to the main frame, a male die, a reciprocating slide carried by the main frame, an adjustable plate carried by said slide, an antifriction-roller mounted on the clamp-frame and adapted to be engaged by said adjustable plate to effect the movement of the clamp to saw-engaging position, and a spring for returning the clamp to normal position.

38. The combination with the main frame, of a female die, a clamp-frame pivoted to the main frame and comprising a plurality of adjustably-connected sections, a clamping-bar forming a part of one of the sections, an antifriction-roller carried by another section, an arm pivoted to the main frame, a male die carried by said arm, a toggle-lever operatively connected to the arm, a reciprocating slide guided on the main frame and operatively connected to the toggle-lever, said slide being adapted to engage the antifriction-roller and move the clamp to engaging position in advance of the operation of the toggle-lever, and means for operating said slide.

39. In a device of the class specified, saw feeding and guiding means, a cutting mechanism, a main shaft having a direct connection with the saw feeding and guiding means, a counter-shaft, eccentric-gearing connecting the main and the counter shaft, and means for connecting the counter-shaft to the cutting mechanism to effect the operation of such cutting mechanism when the smallest radius of the main-shaft gear is in mesh with the largest radius of the counter-shaft gear, the movement of the feeding mechanism being timed to occur during the remaining portion of the rotative movement of the main shaft.

40. In a device of the class specified, the combination with saw feeding and guiding mechanism, of saw cutting mechanism, a main shaft operatively connected to both mechanisms, and means for disconnecting either of said mechanisms from the main shaft to permit independent operative movement of the other.

41. A saw-tooth-straightening mechanism comprising a bifurcated bar, means for moving the same into engagement with a saw-tooth, a hammer mechanism for striking the bar, and means for regulating the strength of the hammer-blow.

42. The combination with saw-feeding mechanism, of a bifurcated bar, yieldable supporting devices for said bar, a yieldable mechanism for moving the bar into engagement with a saw-tooth, and a hammer mechanism for striking the bar.

43. The combination with feeding mechanism, of a tooth-straightening bar, means for supporting the bar at a distance from the saw during the feeding movement thereof, a yieldable mechanism for holding the bar in engagement with a tooth of the saw after the feeding movement, and a hammer mechanism for striking the bar.

44. The combination with saw-feeding mechanism, of a bifurcated bar, an adjustable carrier having a yieldable connection with the bar, means for adjusting the carrier, an independent mechanism for effecting the longitudinal movement of the bar, and a hammer for striking said bar.

45. The combination with feeding mechanism, of a bifurcated tooth-engaging bar, a pivotally-mounted and adjustable carrier in which said bar is yieldably supported, a stud carried by said bar, a spring-supported presser-foot having a slot for the reception of the stud, means for depressing the presser-foot to move the bar into engagement with a saw-tooth, and a hammer for striking said bar.

46. The combination with feeding mechanism, of a bifurcated bar, a pivotally-mounted carrier in which said bar is yieldably supported, a spring-mounted presser-foot connected to the bar and serving to limit the upward movement thereof, means for adjusting the position of the presser-foot, mechanism for actuating the presser-foot to move the bar into engagement with a tooth, and a hammer for striking said bar.

47. A tooth-straightening mechanism comprising a bar and plate rigidly secured to each other and each bifurcated and recessed to form an angular tooth-receiving recess, and means for actuating said bar and plate.

48. The combination with feeding mechanism, of a toothed bar adapted to engage a saw, a hammer, operating mechanism adapted to first move the bar into yielding engagement with the saw and mechanism for actuating the hammer to strike the bar.

49. The combination with a tooth-straightening bar, of a hammer, a handle or helve, a pivot-block forming a fulcrum for the helve, a spring bearing on the block and tending to force the hammer into contact with the bar, and means for partly rotating and tripping said pivot-block.

50. The combination with a tooth-straightening bar, of a hammer, a helve, a pivot-block having a flattened face, a spring in contact with said block, a shoulder on the block, a catch-bar adapted to engage said shoulder and effect the partial rotation of the block, and means for tripping the catch-bar to permit the action of the spring on the block.

51. The combination with a tooth-straightening bar, of a hammer, a helve, a pivot-block to which the helve is secured, a shoulder formed on said pivot-block, a catch-bar adapted to engage the shoulder to effect the partial rotation of the block, means for automatically tripping the catch-bar to release the block, and a spring for returning the block to initial position and for effecting the striking blow of the hammer.

52. The combination with a tooth-straightening bar, of a hammer, a helve, a pivot-block to which the helve is secured said pivot-block having a flattened face, a spring bearing on the block, means for adjusting the stress of the spring, a shoulder formed on the block, a reciprocating catch-bar adapted to engage said shoulder, and studs carried by the block on the catch-bar to effect the automatic disengagement of the catch-bar from the shoulder.

53. The combination with a tooth-straightening bar, of a hammer, a helve, a pivot-block to which the helve is secured said pivot-block having one flattened face, a bifurcated spring pivoted at the point of bifurcation and having one end engaging the pivot-block, an adjusting-screw connected to the opposite arm of the spring, a projecting shoulder formed on said block, a spring-pressed catch-bar adapted to engage said shoulder and to rotate the pivot-block against the stress of the spring, and adjustable screws carried by the pivot-block and the catch-bar for automatically disengaging said catch-bar, substantially as specified.

54. The combination with a tooth-straightening bar, of a slide adapted to move the bar into yielding engagement with a tooth, a hammer, a helve, a pivot-block to which the helve is secured, a spring engaging the pivoted block for effecting the striking blow of the hammer, a shoulder on the pivot-block, a catch-bar adapted to engage said shoulder, a lever operatively connected to the bar-depressing slide, and a bell-crank lever connecting said operating-lever to the catch-bar, substantially as specified.

55. The combination with a saw clamping and feeding means, of an auxiliary clamp adapted to engage the saw between intervals of feeding, a tooth-straightening bar bifurcated and recessed to receive the successive saw-teeth, and a hammer for striking said bar after the saw has been engaged by said auxiliary clamp.

56. The combination with a pair of coöperating cutting-dies, of a chip-extractor movable partly by the operative movement of the male die, and independent mechanism for moving the chip-extractor into and out of the female die.

57. The combination with a pair of coöperating cutting-dies, of a chip-extractor, means for moving the extractor into and out of one of the dies, and a tappet carried by the male-die support and adapted to move the chip-extractor to chip-discharging position.

58. The combination with a female die, of a cutter-bar, a yieldably-supported chip-extractor normally held in contact with said cutter-bar, means for moving the extractor to chip-engaging position, means actuated by the movement of the cutter-bar for moving the extractor to chip-discharging position, and means for returning the extractor to initial position after each operation.

59. The combination with a pair of coöperating cutting-dies, of a saw-feeding mechanism, and an auxiliary corrective feed comprising a finger, and means for first imparting a yieldable movement of the finger to saw-engaging position and then a positive movement to complete the saw-feeding movement.

60. The combination with the cutting-dies and saw clamping and feeding mechanism, of a combined chip-extractor and auxiliary feed comprising a finger, means for imparting a yieldable movement of the finger to a position between adjacent saw-teeth and for positively moving the finger to adjust the position of the saw to the position of the cutting-dies.

61. The combination with saw feeding and clamping means, of a pair of coöperating cutting-dies, a longitudinally-movable slide, means for operating the same, a yieldably-mounted oscillatory lever carried by the slide, a finger depending from said lever and adapted to engage between successive teeth of the saw, a toothed segment pivotally mounted on the slide, a pivoted pawl carried by the slide and adapted to engage the teeth of the segment, a link pivotally connecting the segment to the lever, a spring connecting the quadrant to a fixed point, and means for actuating the slide.

62. The combination of the dies, saw-clamps and feeding devices, a longitudinally-movable slide, means for actuating the slide, a pivoted segment carried by the slide and provided with ratchet-teeth on its arcuate face, pivoted pawls for engaging said teeth, a yieldably-mounted oscillatory lever carried by the slide and having an adjustable connection with the quadrant, a depending finger carried by said lever and adapted to engage between successive saw-teeth, and a spring extending between the lever and slide and normally tending to retain the finger in contact with one of the die members.

63. The combination of the dies, saw clamping and feeding devices, a longitudinally-movable slide, means for actuating the slide, a slide-support, a circumferentially-adjustable spindle carried by said support and provided with a cam, a series of pawls pivotally connected to the slide and adjustable to operative position by the cam, a toothed segment pivotally connected to the slide, a spring connecting the segment to a fixed point, a yieldably-mounted oscillatory lever mounted on the slide and of which the spindle forms a fulcrum, a link pivoted to the quadrant and adjustably connected to the lever, a depending finger adjustably secured to the slide and adapted to engage between successive saw-teeth, movable cam-blocks carried by the slide and adapted to engage the lever, an adjusting-screw carried by one of the die-supports and adapted to make contact with the finger, an adjusting-screw carried by the lever and impinging on the outer face of the slide and a spring normally tending to maintain the finger in contact with one of the die elements.

64. In a device of the class specified, a frame, a female die carried thereby, an arm pivoted to the frame, a cutter-bar carried by the arm and adapted for coöperation with the female die, a movable segment, saw clamping and guiding devices carried by the segment, an auxiliary saw-clamp arranged adjacent to the female die, a bifurcated tooth-straightening bar, a hammer for striking the bar, a combined chip-extractor and auxiliary feed adapted to engage between successive teeth of the saw at a point adjacent to the female die, a main shaft, a crank-handle therein, and means for connecting all of the operating mechanism to said shaft, substantially as specified.

In testimony that I claim the foregoing as my own I have hereto affixed my signature in the presence of two witnesses.

JULIEN H. THAYER.

Witnesses:
  J. O. MOOSE,
  C. A. ROBINSON.